Patented May 31, 1938

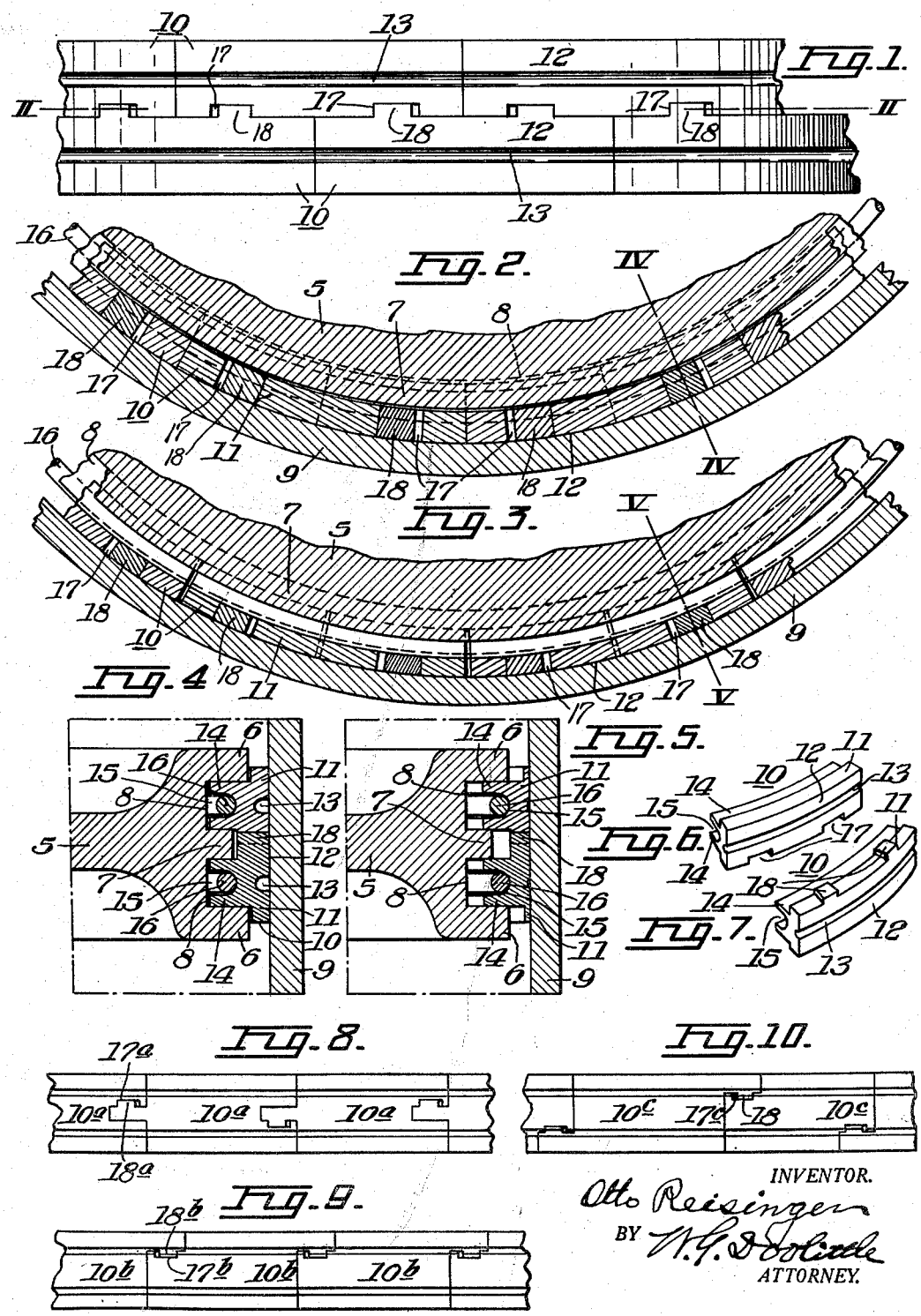

2,119,289

UNITED STATES PATENT OFFICE 2,119,289

PISTON RING CONSTRUCTION

Otto Reisinger, McCandless Township, Allegheny County, Pa.

Application June 19, 1935, Serial No. 27,389

9 Claims. (Cl. 309—29)

This invention relates to new and improved expansible and segmental piston ring construction particularly designed for use in steam cylinders and in the following specification my invention will be described with that in view; its use however is not limited to steam cylinders as it may be advantageously employed for other purposes.

In piston ring construction of the character contemplated by my invention it is usual to have the periphery of the piston formed with annular grooves or channels in which the ring members are disposed and in which an expander means is employed for pressing the ring sections into contact with the wall of the cylinder in which the piston is employed.

It is well known that steam cylinder piston rings of the type outlined above and as heretofore constructed have been the source of considerable trouble and in addition thereto the life of such rings is rather short. One serious trouble is due to the fact that as the cylinder contact surfaces of the ring wear no provision is made to limit the radial movement of the ring sections, consequently the expander means continuing to force the sections outwardly, after wear occurs, will force the same entirely out of the grooves or channels of the piston.

Among the objects of my invention are; to provide a simple and efficient ring construction of the character mentioned embodying means for preventing a radial movement of the segmental members in excess of a predetermined amount; to provide a construction in which the segmental members of the ring structure are provided with coacting means or interlocking means of such a character that a relative separation or a circumferential movement of the segmental members may occur while at the same time limiting the radial movement of said members so that said members cannot be forced out of the channels of the piston; and to provide a construction that will operate to permit steam to by-pass the piston and cause a loss of power which will be immediately noticed by the operator, thus showing that the wear is such as to require a renewal of the piston ring; this knowledge is obtained without removal of the piston and its ring from the cylinder.

In the accompanying drawing, which illustrates applications of my invention:

Fig. 1 is a side elevational view of a portion of a ring embodying my invention;

Fig. 2, a horizontal sectional view of the ring associated with a cylinder, the section of the ring being taken on line II—II of Fig. 1;

Fig. 3, a view similar to Fig. 2 particularly showing the positions of the segmental portions after wear and maximum degree of expansion has been effected;

Fig. 4, a vertical section taken on line IV—IV of Fig. 2;

Fig. 5, a view similar to Fig. 4 taken on line V—V of Fig. 3;

Figs. 6 and 7, perspective views of the segmental ring members of the form of Fig. 1; and Figs. 8, 9 and 10, side elevational views showing a single piece type ring as distinguished from the divided type of the form of Fig. 1, and further showing modifications of the coacting or interlocking means on the segmental members of the ring.

Referring to the drawing, and first to the form of Figs. 1–7, 5 designates a portion of a piston having formed on its periphery between outer flanges 6 and an intermediate ring 7, a pair of spaced apart ring member receiving grooves or channels 8. 9 designates a portion of a wall of a steam cylinder in which the piston is designed to operate.

As illustrated, each of the circumferential channels 8 is adapted to have entered therein portions of segmental ring members generally designated 10. These ring members are disposed in what might be termed upper and lower sets. As shown and as preferred, each member comprises a body portion 11 having its contact face 12 thereof formed with an oil receiving groove 13, and in addition thereto each ring member is formed with inwardly extending spaced apart flanges 14 and a recess 15.

Located within each channel 8 of the piston and within the recessed portion 15 of the segmental members 10 is an expander means in the form of a split spring ring 16, the function of the split ring is to force the segmental members outwardly into close contact with the wall of the cylinder.

Attention is called to the fact that the depth of the channels 8 and the length of the flange portions 14 of the segmental members are such as to provide an elongated bearing of a character that will permit a considerable movement of the inserted portions of the segmental members in the channels 8 without tilting.

The respective segmental members 10 are provided with coacting or interlocking means; as shown, these means include grooves 17 and tongues located at contiguous horizontal or lateral faces of the segments. These coacting or interlocking means on the respective members form a characteristic and important feature of the present invention and function for preventing a radial movement of said members in excess of a predetermined amount, and at the same time to permit a relative circumferential movement of the segmental ring members.

It will be understood that continued operation of the piston wears the ring segments 10, reducing their radial dimensions, this wear permits a compensating outward movement of the segments by the action of the expander rings 16 functioning to maintain a seal with the cylinder wall. Therefore, it is desirable to make the flanges 14 of considerable radial depth for maintaining the elongated bearing with the receiving grooves or channels 8 during such outward movement.

Should the wear of the ring segments cause the same to be expanded outwardly to such an extent that there is insufficient bearing in the channels 8 to prevent tilting of said segments under the combined actions of the expanders and the reciprocating movement of the piston, the segments blow out and serious damage is inflicted upon the cylinder and other parts.

In operation the outward radial movement of the expanding segments effects a resulting relative circumferential separation of the segments in direct proportion to the amount of the radial movement. An important feature of my invention resides in the utilization of this movement of separation as a measure of and for limiting the radial expansion of the segments, and automatically preventing the dangerous failure described above.

For this purpose I provide the ring segments 10 with suitable interlocking means, preferably located substantially in the plane of contact between the upper and lower sets of said segments, and comprising interfitting grooves 17 and tongues 18 having diverging walls or faces, the transverse width or circumferential dimension of the grooves being greater than the corresponding dimension of the tongues.

When first assembled, the segments 10 are abutted in end-to-end relation, with the interfitting tongues and grooves in operative positions, and with the clearance of each groove on that side of its tongue so as to permit a limited amount of relative separation to take place between adjacent segments, such original position of the parts being illustrated in Figs. 1 and 2. It follows from the fact that, due to the grooves opening into the outer surface of the segments and being radially disposed, they may be radially engaged by the cooperating tongue or pin on the connecting segment, while the applied segments are held inwardly against the action of the spring, whereby the entire ring may be readily assembled in its piston groove by the direct radial application of the segments thereto, as long as the tongues and grooves thereof are interengaged. In other words, by keeping the ring compressed against the spring, the segments thereof may be simply dropped or inserted in place.

Wearing of the faces 12 of the segments 10, as in Figs. 3 and 5, is accompanied by a radial outward expansion of the segments until the resulting separation thereof closes and eliminates the above mentioned clearance between the tongues and grooves, at which instant, further relative separation of the segments is prevented, thereby arresting further radial expansion.

The termination of the sealing pressure of the ring upon the cylinder, causes leakage and steam by-passes the piston, whereby the operator readily ascertains the necessity of changing rings, indicated by loss of power and steam conditions in the engine exhaust.

It will be readily seen, that in order to insure the proper bearing of the flanges 14 in the channels 8, in any known size of piston and ring, it becomes necessary only to proportion the permissive relative separation of the segments to the amount of travel desired in the ring channels 8, thereby limiting the outward movement of the segments before dangerous wear occurs.

Rings constructed in accordance with my invention are therefore both safe and economical, it being unnecessary to frequently inspect the same as in present practice, said rings correctly indicating, by permitting escape of steam, the proper time for replacement. When the segments reach the limit of their expansion, the ring becomes a unitary structure locked against further expansion.

In the forms of Figs. 8 to 10 inclusive I have shown what may be termed a single piece type ring made of segmental members as distinguished from the form of Fig. 1 which is composed of two sets of ring segments.

In Fig. 8, the interlocking means 17a and 18a are disposed adjacent the ends of the ring segments 10a and overlap and are arranged centrally of the adjacent segmental members each member being formed with a groove 17a and a tongue 18a.

In the form of Fig. 9 the interlocking means are similar to those of the form of Fig. 8, but are arranged on the segmental members 10b adjacent edges thereof instead of centrally and are designated 17b and 18b.

Fig. 10 shows a still further modified construction of coacting locking means; in this form the segmental members 10c are not similar as in the other forms as one member 10c is formed with overlapping tongue members 18c and adjacent member with the grooves 17c.

In all the forms shown it will be understood that the interlocking means are such as to permit of a limited movement of a tongue within a groove thus permitting a radial movement of the segmental members to a predetermined amount only.

I claim:

1. The combination with a piston, of an expansible ring therefor mounted thereon including a plurality of segmental members, means for expanding the members, and means on each member coacting with complemental means on adjacent members for preventing a radial movement of said members in excess of a predetermined amount, said means including a tongue and groove connection having all of the grooves in lateral outer faces of the segments and extending inwardly from the outer surfaces of the lateral faces towards the center of the piston.

2. The combination with a piston, of an expansible ring therefor mounted thereon including a plurality of radially applicable segments, means for radially expanding the segments and separating them, and means limiting the circumferential movement of separation of each individual segment relative to an adjacent segment comprising a tongue and groove connection, all of the said groove portions of the connections extending inwardly along a lateral outer face of the segments.

3. The combination with a piston having a channel on its periphery, of an expansible ring therefor including a plurality of segmental members having portions entered in the channel and portions projected therefrom, means for expanding the members disposed in the channel and engaging the ring portions therein, and tongue and groove connections for the members having the grooves in lateral outer faces of the segments and of dimensions to permit movements of the tongues therein to permit a relative separation of the segments and limit the radial movement of the members while maintaining the assemblage.

4. The combination with a piston, of an expansible ring therefor mounted thereon including superimposed rings each including a plurality of segmental members, means for expanding the members, said members having means on a lateral outer face thereof interlocking with complemental means on adjacent members for permitting a relative separation thereof and limiting the radial movement of the members while assembled.

5. An expansible piston ring including a plurality of segmental members, means on each member coacting with complemental means on adjacent members for limiting radial movement of said members upon outward expansion thereof while assembled, said means including projections and grooves in contiguous lateral faces of the members, the grooves extending radially along such faces inwardly from and opening into the outer curved faces of the members, said members having clearance in a circumferential direction at the coacting means.

6. The combination with a cylinder and a piston operable therein, of an expansible ring for the piston mounted thereon including a plurality of segments each radially applicable to the piston and movable radially outward relatively to the remainder, projections on each segment interengaging with grooves on adjacent segments, the grooves being disposed in outer faces of the segments and extending radially inward from said outer faces, said segments having a clearance with respect to each other in a circumferential direction at the interengaged means, said means coacting to limit the expansion of the segments whereby to destroy sealing pressure of the segments while maintaining the ring assembled on the piston.

7. The combination with a cylinder and a piston operable therein, of an expansible ring for the piston mounted thereon including a plurality of segments each radially applicable to the piston and movable radially outward relatively to the remainder, projections on each segment interengaging with complemental means on adjacent segments comprising grooves extending inwardly along an outer face of the segments, said segments having a clearance with respect to each other in a circumferential direction at the interengaged means, said means coacting to limit the expansion of the segments whereby to destroy sealing pressure of the segments and thereby indicate the destructive wear on the segments without necessitating an inspection thereof and while maintaining the ring assembled on the piston.

8. An expansible piston ring including a plurality of segmental members, means on each member coacting with complemental means on adjacent members for preventing a radial movement of said members in excess of a predetermined amount, said means including a tongue and groove connection having all of the grooves in lateral outer faces of the segments and extending inwardly from the outer surfaces of the lateral faces.

9. The combination with a piston having an annular groove therein, of a piston ring therefor comprising a plurality of segmental members having tongue and groove connections extending transversely of the ring between said members, the groove portions of the connections opening in the outer curved faces of the members, whereby to receive the tongue portions of the next adjacent members upon radial application thereof to the piston groove, and means in the piston groove for expanding the said members.

OTTO REISINGER.